United States Patent
Wang et al.

(10) Patent No.: US 8,325,723 B1
(45) Date of Patent: Dec. 4, 2012

(54) METHOD AND APPARATUS FOR DYNAMIC TRAFFIC MANAGEMENT WITH PACKET CLASSIFICATION

(75) Inventors: Chi-Lie Wang, Milpitas, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 366 days.

(21) Appl. No.: 12/712,516

(22) Filed: Feb. 25, 2010

(51) Int. Cl.
*H04L 12/28* (2006.01)
*G01R 31/08* (2006.01)

(52) U.S. Cl. .................. 370/389; 370/235; 370/412

(58) Field of Classification Search .................. None
See application file for complete search history.

(56) References Cited

U.S. PATENT DOCUMENTS

| | | | |
|---|---|---|---|
| 6,195,335 B1 * | 2/2001 | Calvignac et al. | 370/236 |
| 6,671,275 B1 * | 12/2003 | Wong et al. | 370/389 |
| 7,042,843 B2 * | 5/2006 | Ni | 370/231 |
| 7,305,487 B2 * | 12/2007 | Blumrich et al. | 709/238 |
| 7,319,669 B1 * | 1/2008 | Kunz et al. | 370/235 |
| 7,474,670 B2 * | 1/2009 | Nowshadi | 370/462 |
| 7,796,629 B1 * | 9/2010 | MacAdam et al. | 370/422 |
| 8,014,288 B1 * | 9/2011 | MacAdam | 370/235.1 |
| 8,045,563 B2 * | 10/2011 | Lee | 370/395.41 |
| 8,116,311 B1 * | 2/2012 | Kunz et al. | 370/389 |
| 2002/0122387 A1 * | 9/2002 | Ni | 370/231 |
| 2003/0103514 A1 * | 6/2003 | Nam et al. | 370/412 |
| 2003/0123468 A1 * | 7/2003 | Nong | 370/412 |
| 2003/0152078 A1 * | 8/2003 | Henderson et al. | 370/389 |
| 2003/0223445 A1 * | 12/2003 | Lodha | 370/412 |
| 2004/0022263 A1 * | 2/2004 | Zhao et al. | 370/461 |
| 2004/0100980 A1 * | 5/2004 | Jacobs et al. | 370/412 |
| 2005/0100035 A1 * | 5/2005 | Chiou et al. | 370/412 |
| 2005/0249206 A1 * | 11/2005 | Wybenga et al. | 370/389 |
| 2005/0276264 A1 * | 12/2005 | Cordero et al. | 370/389 |
| 2006/0023718 A1 * | 2/2006 | Joly | 370/392 |
| 2007/0121630 A1 * | 5/2007 | Stephen et al. | 370/390 |
| 2008/0186961 A1 * | 8/2008 | Yun et al. | 370/360 |
| 2008/0273546 A1 * | 11/2008 | Johnson et al. | 370/419 |
| 2009/0168790 A1 * | 7/2009 | Lee | 370/412 |
| 2009/0274049 A1 * | 11/2009 | Lai | 370/236 |
| 2011/0069717 A1 * | 3/2011 | Osano et al. | 370/415 |

* cited by examiner

*Primary Examiner* — Hassan Phillips
*Assistant Examiner* — Hicham Foud
(74) *Attorney, Agent, or Firm* — Heimlich Law, PC; Alan Heimlich, Esq.

(57) ABSTRACT

A method and apparatus for dynamic traffic management with packet classification have been disclosed where packet size, variation, and count may be used to select credit or packet based arbitration.

15 Claims, 10 Drawing Sheets

METHOD AND APPARATUS FOR DYNAMIC TRAFFIC MANAGEMENT WITH PACKET CLASSIFICATION

RELATED APPLICATION

This application is related to Application No. (not yet issued) filed this same date by the same inventors titled "Method and Apparatus for Selective Packet Discard", which is hereby incorporated herein by reference in its entirety including all incorporated references therein. This application is related to Application No. (not yet issued) filed this same date by the same inventors titled "Method and Apparatus for Congestion and Fault Management with Time-to-Live", which is hereby incorporated herein by reference in its entirety including all incorporated references therein.

FIELD OF THE INVENTION

The present invention pertains to switches. More particularly, the present invention relates to a method and apparatus for dynamic traffic management with packet classification.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

Some of these requirements are challenging, for example, an 18-port Serial Rapid IO (sRIO) Gen2 Switch may be required to achieve very high performance (up to 360 Gbit) with minimum packet latency (<30 ns excluding sRIO protocol stack delay) to meet wireless infrastructure customer's requirements for WCDMA/LTE Base Stations.

A switch needs to be able to deal with packets of varying sizes and meet bandwidth and latency requirements. Switch packet forwarding can be packet based arbitration or credit based arbitration. Packet based arbitration can only achieve bandwidth fairness with fixed size packets but not for variable size packets. Credit based arbitration can achieve bandwidth fairness with variable size packets but it can penalize high priority traffic and miss the required latency if prior occurred lower priority traffic has consumed all its credit. This presents a problem.

BRIEF DESCRIPTION OF THE DRAWINGS

The invention is illustrated by way of example and not limitation in the figures of the accompanying drawings in which.

DETAILED DESCRIPTION

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations.

One embodiment the invention optimizes both packet fairness and bandwidth fairness with fixed packet size and variable packet size under dynamic traffic flow.

In order to achieve bandwidth fairness across switch fabric, credit based arbitration can be used. This scheme is good for variable size packets as for packets forwarding to the same Output Port, fair bandwidth utilization can be achieved from each Input Ports. However, if fixed size packets is used, credit based arbitration could have some drawback. For instance, if one Input Port's credit has been consumed through prior occurred lower priority traffic, higher priority traffic comes in from this port could be penalized as other Input Ports will be granted first for packet forwarding since they have credit available.

Packet based arbitration is good for fixed size packet as while forwarding the packets to the same Output Port, bandwidth fairness can still be achieved from each Input Port without causing higher priority traffic to be penalized by prior occurred lower priority as being described above. However, if real time traffic pattern can be changed dynamically, both schemes being described above will have their drawback as packet based arbitration may be bandwidth unfair on variable size packets and credit based arbitration may cause higher priority traffic to exceed its latency limit.

In one embodiment of the invention, a method is disclosed which will allow packet based arbitration or credit based arbitration to be selected statically based on specific application needs. Furthermore, a set of rules can be defined and evaluated based on real time traffic flow. As a result, packet based arbitration or credit based arbitration can be selected and changed dynamically. If traffic with various size packets come in, credit based arbitration will be selected to achieve bandwidth fairness. Otherwise, if packet size is limited with small variation, packet based arbitration can be selected which can still achieve bandwidth fairness without penalizing high priority traffic due to prior occurred lower priority traffic.

In one embodiment the invention where Crosspoint Buffers are utilized arbitration will be needed to select a particular CB for packet forwarding to the Output Port. For example, for an 18-port switch, there are 18 Crosspoint Buffers (CB) within a given column. Each CB receives packets from one specific Input Port. Since there are 18 CBs that corresponding to an Output Port, arbitration will be needed to select a particular CB for packet forwarding to the Output Port.

In one embodiment of the invention Packet based arbitration can be used to provide fairness on packet basis. Credit based arbitration can be used to provide fairness on dword (64-bit) basis to be bandwidth fair.

In one embodiment of the invention depending on traffic pattern and application requirements, packet based scheme has advantage for fixed size packets and credit based scheme has advantage for variable size packets.

In one embodiment of the invention if credit based arbitration is used, it can maintain better fairness on variable size packets, but higher priority traffic may be penalized by prior occurred lower priority flows from the same Input Port if it has already consumed all the available credits.

In one embodiment of the invention a set of rules can be defined to select the proper arbitration method based on real time traffic pattern to provide optimized fairness (either packet based or credit based).

In one embodiment of the invention each CB within a given column has a set of 35 Packet Size registers which correspond to the received packet size (1~35 dwords).

In one embodiment of the invention while a packet is being forwarded from an Input Port to the CB, the respective Packet Size register will be incremented by 1 based on the received packet size. While the packet is being read out of the CB, its Packet Size register will be decremented by 1.

In one embodiment of the invention the number of different packet sizes currently being stored in the Switch Fabric for a given CB will be based on the total number of Packet Size registers with non-zero value.

In one embodiment of the invention Packet Size Count Register will be loaded by summing all the non-zero Packet Size registers. For instance, if there are 5 Packet Size registers with non-zero value, Packet Size Count Register will be set to 5.

In one embodiment of the invention Packet Size Variation Register will store the maximum packet size variation. It can be constructed by: "largest Packet Size Register with nonzero value" subtracts "smallest Packet Size Register with non-zero value". For instance, if there are 5 different packet sizes being stored (3, 8, 20, 25 & 31), Packet Size Variation register will be set to 28 (31−3=28).

In one embodiment of the invention a set of rules can be defined to select the proper arbitration method based on real time traffic pattern to provide optimized fairness (either packet based or credit based). In one embodiment of the invention a rule, for example, Rule 1 can be defined as "Packet size count <X" where X is a programmable packet size count threshold.

In one embodiment of the invention a set of rules can be defined to select the proper arbitration method based on real time traffic pattern to provide optimized fairness (either packet based or credit based). In one embodiment of the invention a rule, for example, Rule 2 can be defined as "Packet size variation <Y" where Y is a programmable packet size variation threshold.

In one embodiment of the invention a set of rules can be defined to select the proper arbitration method based on real time traffic pattern to provide optimized fairness (either packet based or credit based). For example if both Rule 1 and Rule 2 are met across all the CBs within a given column, packet based arbitration can be selected as the packets with different sizes are limited and with small size variation. This scheme will allow bandwidth fairness to be achieved without causing prior occurred lower priority traffic to penalize higher priority traffic from the same Input Port if credit based arbitration is used. Otherwise, if traffic has variable size payload with larger size variations, credit based arbitration can be used to achieve bandwidth fairness across all CBs. Using this scheme allows packet based arbitration or credit based arbitration to be selected dynamically based on real time traffic flow. As a result, optimized traffic management can be achieved for bandwidth fairness without causing any latency issue on higher priority traffic.

In one embodiment of the invention, rules and arbitration are on a per column basis. That is each column has a scheduler that may be rule based and provide dynamic arbitration completely independent of other columns. Thus, for example, in a switch having 18 Egress Ports there are 18 columns each with its own set of rules and dynamically adjusting the arbitration (packet/credit).

Figure 3:
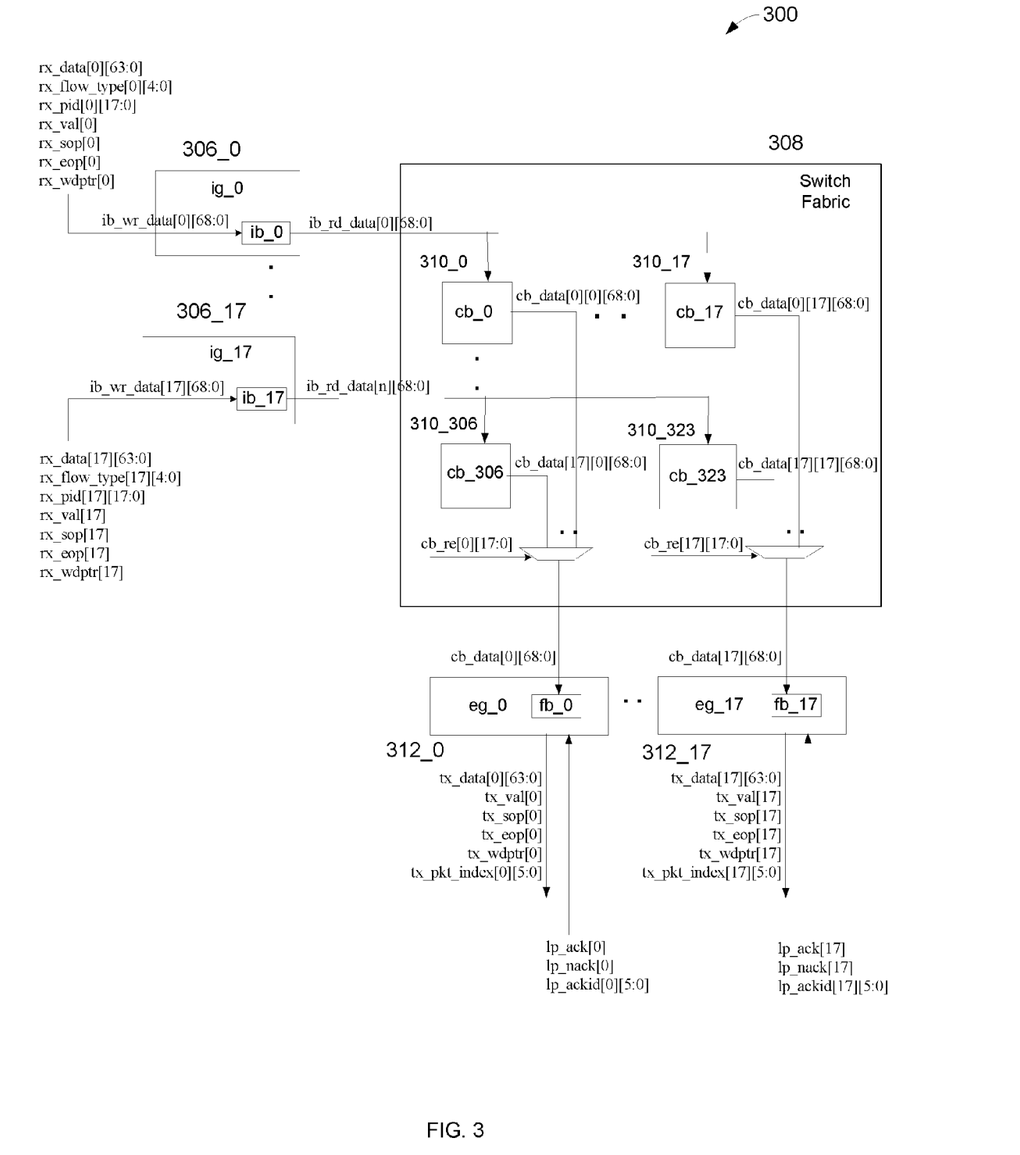
FIG. 3 illustrates one embodiment of the invention showing a data path within a switch.

FIG. 3 illustrates, generally at 300, one embodiment of the invention showing a Switch Data Path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig__0 through ig__17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib__0 through ib__17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib__0 through ib__17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb__0 through cb__323.

In FIG. 3, at 312_0 through 312_17 are egress ports (eg__0 through eg__17) each receiving a variety of inputs from the switch fabric 308 (cb_data[q][68:0]), where q denotes the egress port number (0 through 17). Each egress port has an egress buffer denoted fb__0 through fb__17. Each egress port has outputs, for example, transmit data (tx_data[q][63:0]), transmit valid cycle (tx_val[q]), transmit start of packet (tx_sop[q]), transmit end of packet (tx_eop[q]), transmit word pointer (tx_wdptr[q]), and transmit packet index (tx_pkt_index[q][5:0]), where q denotes the egress port number (0 through 17). Each egress port also has inputs received from a link partner, for example link partner ack (lp_ack[q]), link partner nack (lp_nack[q]), and link partner ack ID (lp_ackid[q][5:0]) where again q denotes the egress port number (0 through 17).

In one embodiment of the invention, while the packet is being received into Ingress Port's IB, a set of pre-programmed pattern(s) can be used to compare against the incoming packet's header/payload if packet filter and/or trace function is enabled. Since the received packet has been forwarded to the CB as soon as SOP is received, the forwarded packet may need to be discarded if packet filtering is enabled with pattern match (by setting discard_normal), trace is enabled with pattern not match (by setting discard_trace), or any error being detected upon packet reception (by setting both discard_normal and discard_trace). These two bits will be appended into higher 2 bits of the packet forwarding data path and traveling through IB, CB to FB. Upon receiving this packet at Egress Port, it can start forwarding the packet out to its Link Partner and at the same time; store the discard information into Packet Discard Mapper. It will then based on its port configuration and the discard bit setting to generate a STOMP control symbol for requesting packet cancellation. After Link Partner returns Packet Not Acceptable control symbol (NACK), the stored packet discard information will be retrieved to be used for determining whether the memory buffer being used to store this packet can be released.

In one embodiment of the invention, while the packet is being received into the Ingress Port, rx_data[63:0] is for packet data, rx_pid[17:0] indicates which Egress Port that the packet shall be forwarded to, rx_flow_type[4:0] is for packet type (VC0 with different priority level along with VC1/VC5), rx_val indicates a valid data cycle, rx_sop is for Start of Packet Delimiter, rx_eop is for End of Packet Delimiter and rx_wdptr is for packet word boundary indication. This information will be stored into IB along with packet discard indication while the packet is being received at Ingress Port. When the stored packet is being read out of IB, the lower 64-bit (ib_rd_data[63:0]) are for packet data, ib_rd_data[64] is the stored SOP, ib_rd_data[65] is the stored EOP, ib_rd_data[66] is the stored word pointer, ib_rd_data[67] is the stored normal port discard bit and ib_rd_data[68] is the stored trace port dicard bit. The information can be used to control packet write, read and discard while traveling through CB and FB to be transmitted out of Egress Port.

Figure 4:
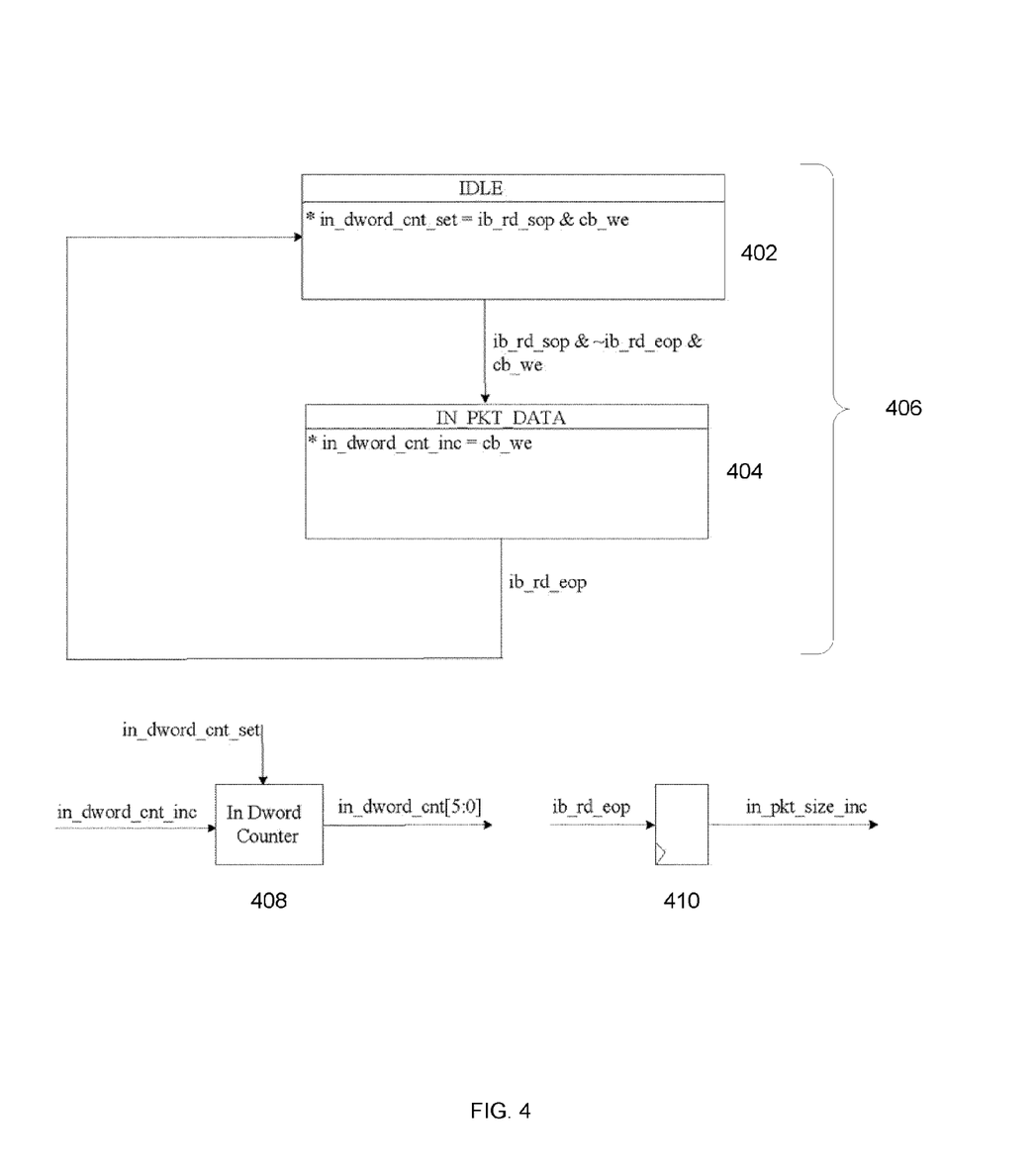
FIG. 4 illustrates one embodiment of the invention showing inbound packet size recording.

FIG. 4 illustrates, generally at 400, one embodiment of the invention showing Inbound Packet Size Recording. In one embodiment of the invention, while a packet is being read out of the Input Buffer to be written to a specific Crosspoint Buffer, the packet size will be recorded by parsing the packet's SOP, Data, and EOP. After the packet size has been determined, the corresponding Packet Size register will be incremented by 1 to indicate the packet with the specific size has been stored into the corresponding CB.

In one embodiment of the invention, each time if a SOP cycle (ib_rd_sop) is being detected for a packet being forwarded to CB, in_dword_cnt_set will be generated which will set in_dword_cnt[5:0] to 1.

In one embodiment of the invention, for each subsequent Data cycles and EOP cycle, in_dword_cnt[5:0] will be incremented accordingly with the final dword count being recorded at EOP cycle (in_rd_eop).

In one embodiment of the invention, in_pkt_size_inc will be generated one cycle after ib_rd_eop to increment the selected pkt_size_reg being indexed through in_dword_cnt [5:0].

In one embodiment of the invention, ib_we will be generated through pipelining rx_val. This signal will be used to write ib_wr_data[68:0] to Input Buffer.

At 406 is logic having block 402 (IDLE) and 404 (IN_PKT_DATA). Within each block 402 and 404 are logic equations representing the generation of real-world signals. As may be seen the output of block 402 is ib_rd_sop & ~ib_rd_eop & cb_we which enters block 404. Block 404 output ib_rd_eop enters block 402. The notation is self-explanatory where ib denotes input buffer, rd denotes read, sop denotes start of packet delimiter, eop denotes end of packet delimiter, cb denotes crosspoint buffer, we denotes write enable, etc. The notation of & is known to one of skill in the art as the AND operation. Likewise, other standard logic notations are shown (such as, but not limited to |, ~, etc.) as are standard logic symbols for functions in other parts of FIG. 4 as well as in other Figures.

At 408 is logic block which takes two inputs as noted, and produces an output as noted.

At 410 is logic which takes an input and produces an output as noted.

While the dword count (dword_cnt) is shown as 6 bits [5:0] to cover the packet size range of 1 to 35 dwords, the invention is not so limited, and any size count could be used based on the maximum packet size.

Figure 5:
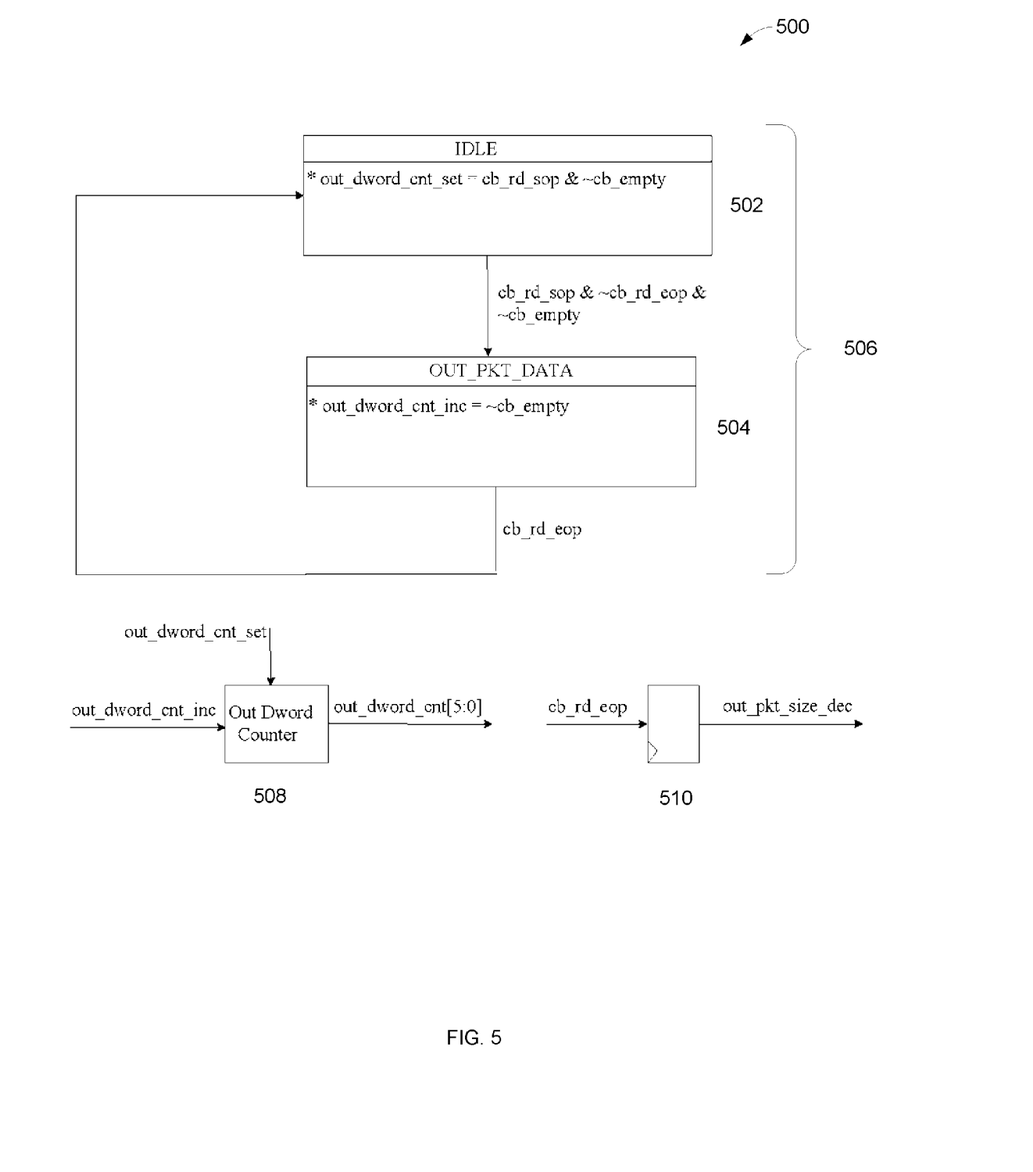
FIG. 5 illustrates one embodiment of the invention showing outbound packet size stripping.

FIG. 5 illustrates, generally at 500, one embodiment of the invention showing Outbound Packet Size Stripping. In one embodiment of the invention, while a packet is being transmitted out of the corresponding Crosspoint Buffer to the Egress Port's Final Buffer, the packet size will be recorded by parsing the packet's SOP, Data, and EOP. After the packet size has been determined, the corresponding Packet Size register will be decremented by 1 to indicate the packet with the specific size has been removed from the CB.

In one embodiment of the invention, each time if CB is not empty and a SOP cycle (cb_rd_sop) is being detected for a packet being transmitted out of a CB, out_dword_cnt_set will be generated which will set out_dword_cnt[5:0] to 1.

In one embodiment of the invention, for each subsequent Data cycles and EOP cycle (cb_rd_eop), out_dword_cnt[5:0] will be incremented accordingly with the final dword count being recorded at EOP cycle.

In one embodiment of the invention, out_pkt_size_dec will be asserted one cycle after cb_rd_eop to decrement the selected pkt_size_reg being selected through out_dword_cnt [5:0].

At 506 is logic having block 502 (IDLE) and 404 (OUT_PKT_DATA). Within each block 502 and 504 are logic equations representing the generation of real-world signals. As may be seen the output of block 502 is cb_rd_sop & ~cb_rd_eop & ~cb_empty which enters block 504. Block 504 output cb_rd_eop enters block 502. The notation is self-explanatory as noted above.

At 508 is logic block which takes two inputs as noted, and produces an output as noted.

At 510 is logic which takes an input and produces an output as noted.

Again as noted above, dword count (dword_cnt) may be any size as based on the maximum packet size.

Figure 6:
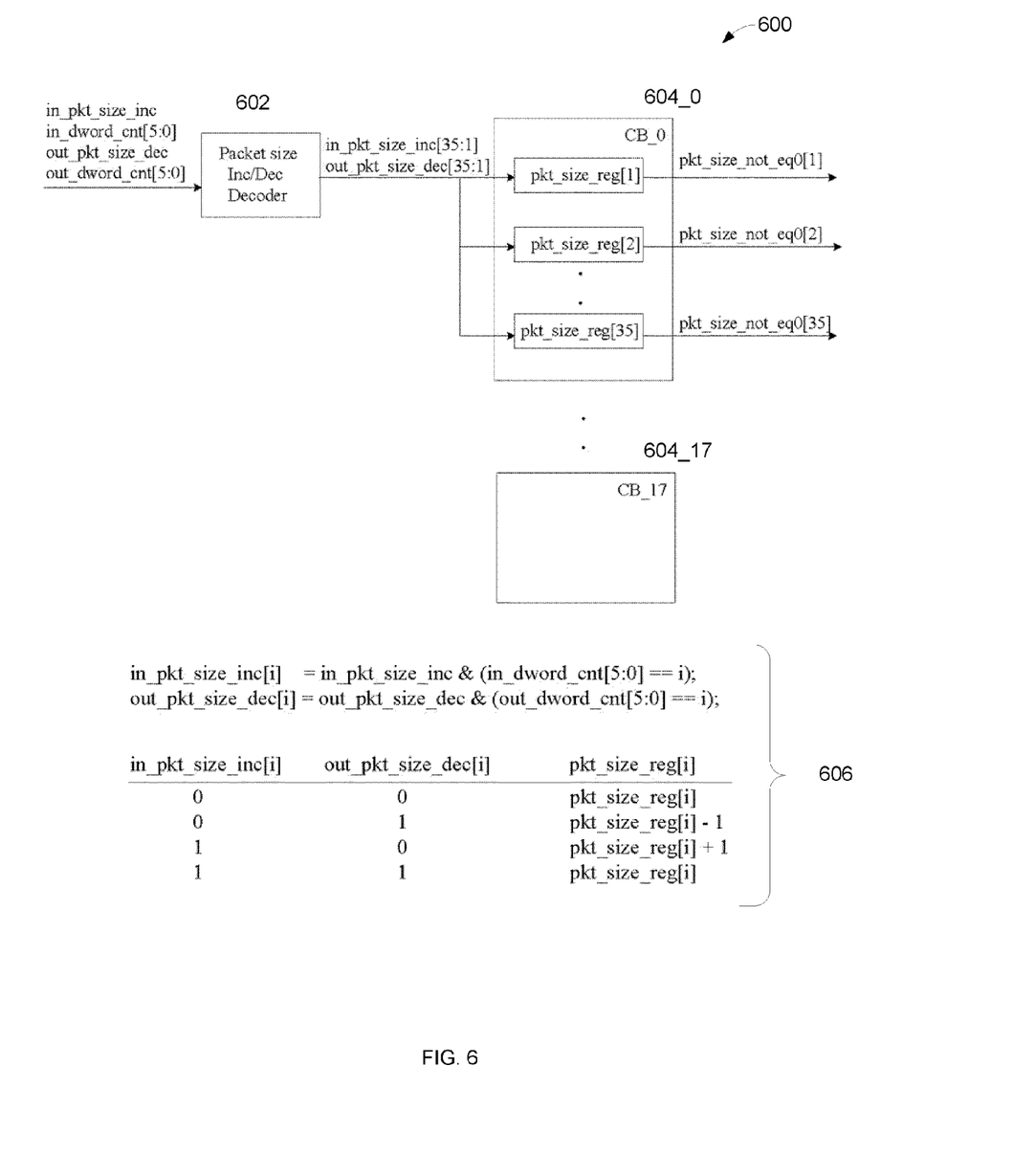
FIG. 6 illustrates one embodiment of the invention showing packet size registers.

FIG. 6 illustrates, generally at 600, one embodiment of the invention showing Packet Size Registers. In one embodiment of the invention, 35 Packet Size registers for each CB are used to store the packet count for each specific size (1~35 dwords). Each time a packet is being transferred into the CB, the corresponding Packet Size register will be incremented by 1. Each time a packet is being transferred out of the CB, its Packet Size register will be decremented by 1. For all the Packet Size registers with non-zero value, they are used to compute packet size count for the total number of different sizes and packet size variation between the largest packet and the smallest packet.

In one embodiment of the invention, in_pkt_size_inc[i] will be asserted to increment the corresponding packet size register each time a packet with a specific size is being written into the CB.

In one embodiment of the invention, out_pkt_size_dec[i] will be asserted to decrement the corresponding packet size register each time a packet with a specific size is being read out of the CB.

In one embodiment of the invention, pkt_size_not_eq0[i] will be asserted for the corresponding packet size register with non-zero value.

At 602 is logic block (Packet size Inc/Dec Decoder), and at 604_0 is logic block having 35 packet size registers as noted for CB_0. Additional logic blocks are shown ending at 604_17 for CB_17. At 606 are a set of logic equations and a table indicating logic and resulting operations. For example if in_pkt_size_inc[i] is a 0 and out_pkt_size_dec[i] is a 1 then per the table pkt_size_reg[i] will become pkt_size_reg[i]−1 (i.e. decremented by 1).

Figure 7:
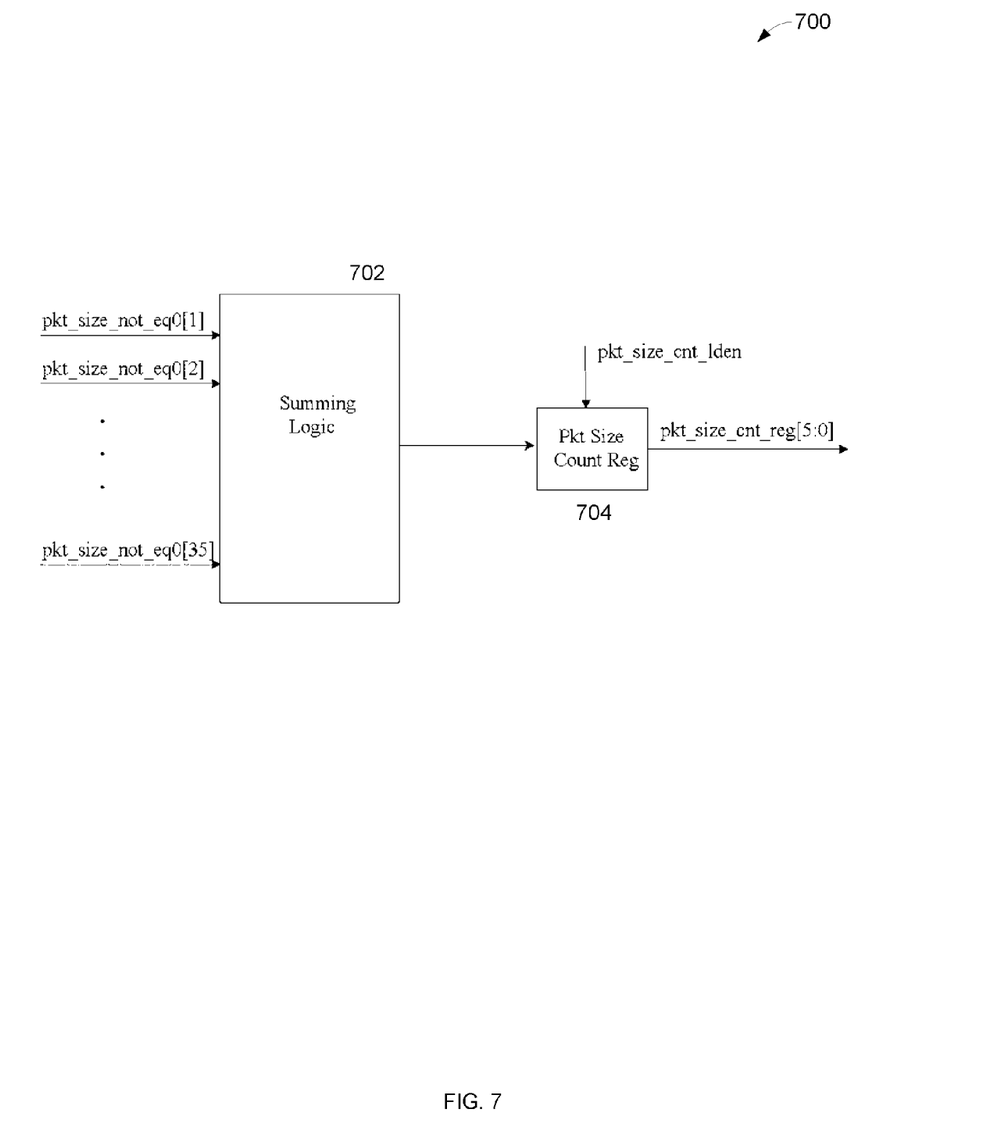
FIG. 7 illustrates one embodiment of the invention showing packet size count register.

FIG. 7 illustrates, generally at 700, one embodiment of the invention showing Packet Size Count Register. In one embodiment of the invention, each CB will have a Packet Size Count Register. This register is used to record the total count of different packet sizes. For instance, if there are packets with size 5, 21 & 32, Packet Size Count Register will have 3 recorded as packet size count. This information is useful to determine whether packet based arbitration or credit based arbitration shall be selected.

In one embodiment of the invention, Packet Size Count register will be used to record the total number of different packet sizes. The total count will be calculated through the sum of all the pkt_size_reg with non-zero value. It will be loaded into Packet Size Count register periodically for rule check.

At 702 is logic block (Summing Logic), and at 704 is logic block (Pkt Size Count Reg) as noted. As may be seen the inputs to 702 are packet sizes (1 to 35) that are not zero. The output of 702 thus represents the total number of different packet sizes at a given time. So for example, if in a given time period 1 packet of length 5 dwords and 7 packets of length 11 dwords are received then the output of 702 would be 2 because only 2 packet sizes were received.

Figure 8:
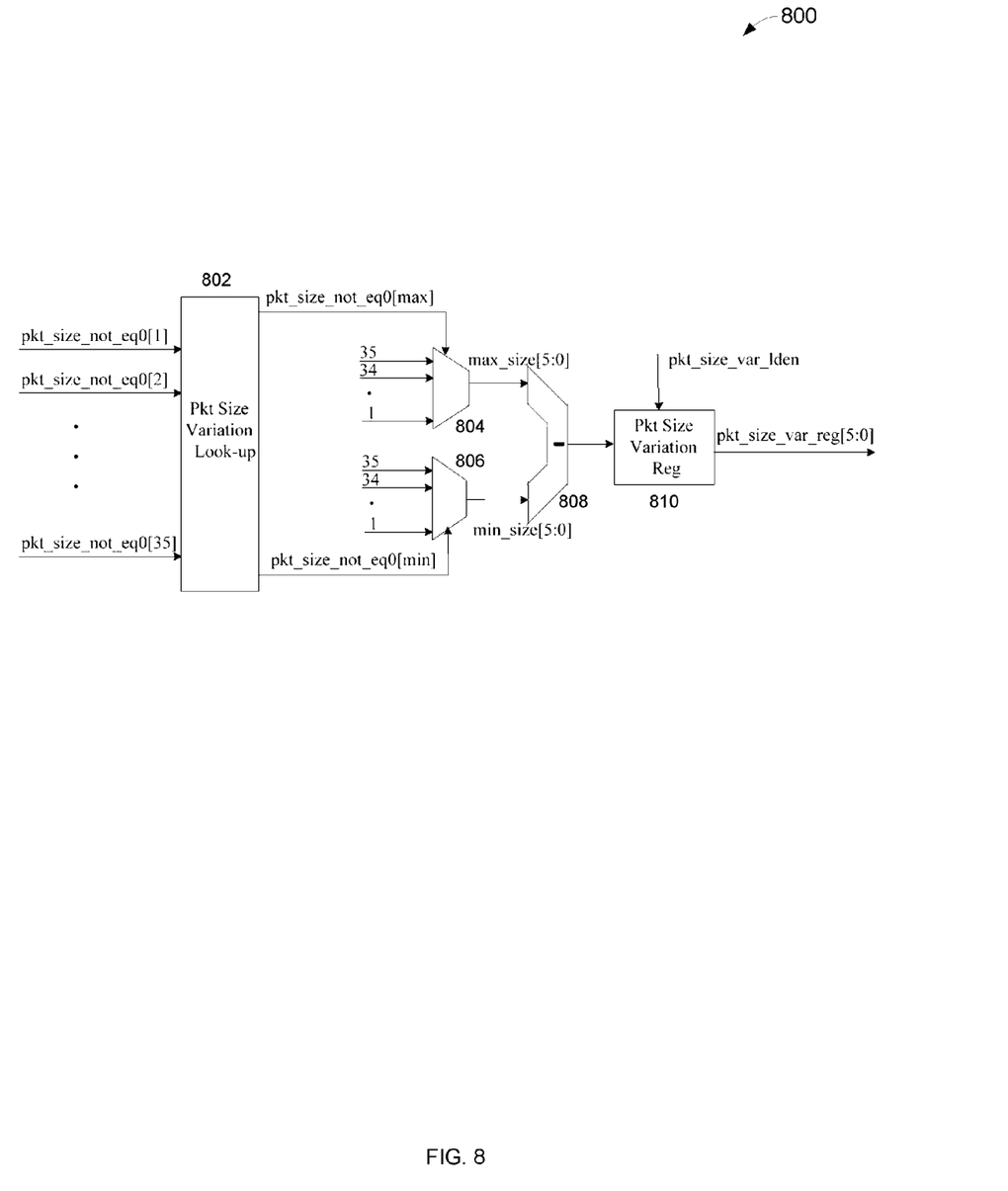
FIG. 8 illustrates one embodiment of the invention showing packet size variation register.

FIG. 8 illustrates, generally at 800, one embodiment of the invention showing Packet Size Variation Register. In one embodiment of the invention, each CB will also have a Packet Size Variation Register. This register is used to record the size variation between the largest packet and the smallest packet that are currently being stored in the CB.

In one embodiment of the invention, Packet Size Variation Look-up logic will be used to search for the largest packet size (from 35 to 1 with the highest number having non-zero indication) and the smallest packet size (from 1 to 35 with the lowest number having on-zero indication).

In one embodiment of the invention, after the smallest packet size being subtracted from the largest packet size, the result will be loaded into Packet Size Variation resister for rule check.

At 802 is logic block (Pkt Size Variation Look-up), at 804 is a selection logic block for a maximum size, at 806 is a selection logic block for a minimum size, at 808 is a subtraction logic block, and at 810 is a register (Pkt Size Variation Reg).

Figure 9:
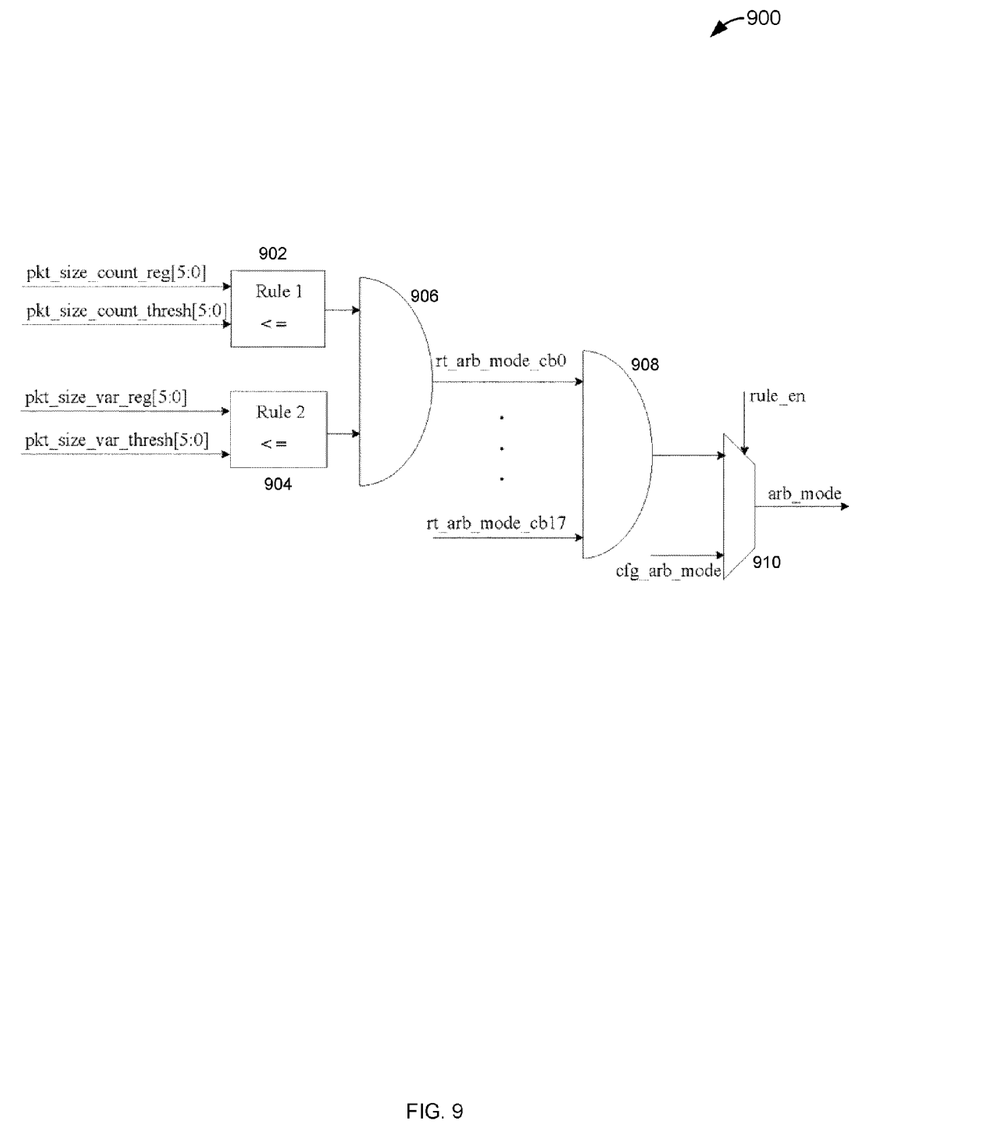
FIG. 9 illustrates one embodiment of the invention showing packet rule checker.

FIG. 9 illustrates, generally at 900, one embodiment of the invention showing Packet Rule Checker. In one embodiment of the invention, Each CB's Packet Size Count Register and Packet Size Variation Register will be submitted to Packet Rule Checker for determining either packet based arbitration or credit based arbitration shall be performed based on real time traffic flow. Packet Size Count Threshold and Packet Size Variation threshold can be pre-programmed to a specific value. If dynamic arbitration is not enabled (rule_en=0), static arbitration scheme will be supported through arbitration mode bit (packet based arbitration: cfg_arb_mode=1; credit based arbitration: cfg_arb_mode=0) which can be pre-configured by software. Otherwise, dynamic arbitration mode (rule_en=1) will be invoked to select packet based arbitration or credit based arbitration based on rule check result with dynamic traffic flow.

In one embodiment of the invention, Packet Rule Checker can be used to select packet based arbitration or credit based arbitration based on real time traffic.

In one embodiment of the invention, if Packet Size Count Register is less than or equal to Packet Size Count Threshold, Rule 1 match will be used as the first qualifier to enable packet based arbitration as there are limited packet sizes available in the CB.

In one embodiment of the invention, if Packet Size Variation Register is less than or equal to Packet Size Variation Threshold, Rule 2 match will be used as the second qualifier to enable packet based arbitration as there are small packet size variations in the CB.

In one embodiment of the invention, rt_arb_mode for each CB will be set if both rule 1 and rule 2 had match. All CBs with rt_arb_mode set will enable packet based arbitration. Otherwise, credit based arbitration will be selected.

At 902 is logic block (Rule 1), at 904 is logic block (Rule 2), at 906 is logic for arbitration mode at 908 is logic for arbitration mode, and at 910 is selection logic block for arbitration mode.

As may be seen block 906 is replicated for cb0 through cb17. Logic block 908 output when a 1 indicates packet based arbitration. Note that as shown, for packet based arbitration every CB in a column must meet Rule 1 and Rule 2. Note also, as previously stated each column of CBs has its own scheduler and so has independently determined packet or credit based arbitration. Thus for example, FIG. 9 represents a single column of CBs which are tied to a particular Egress Port.

Figure 10:
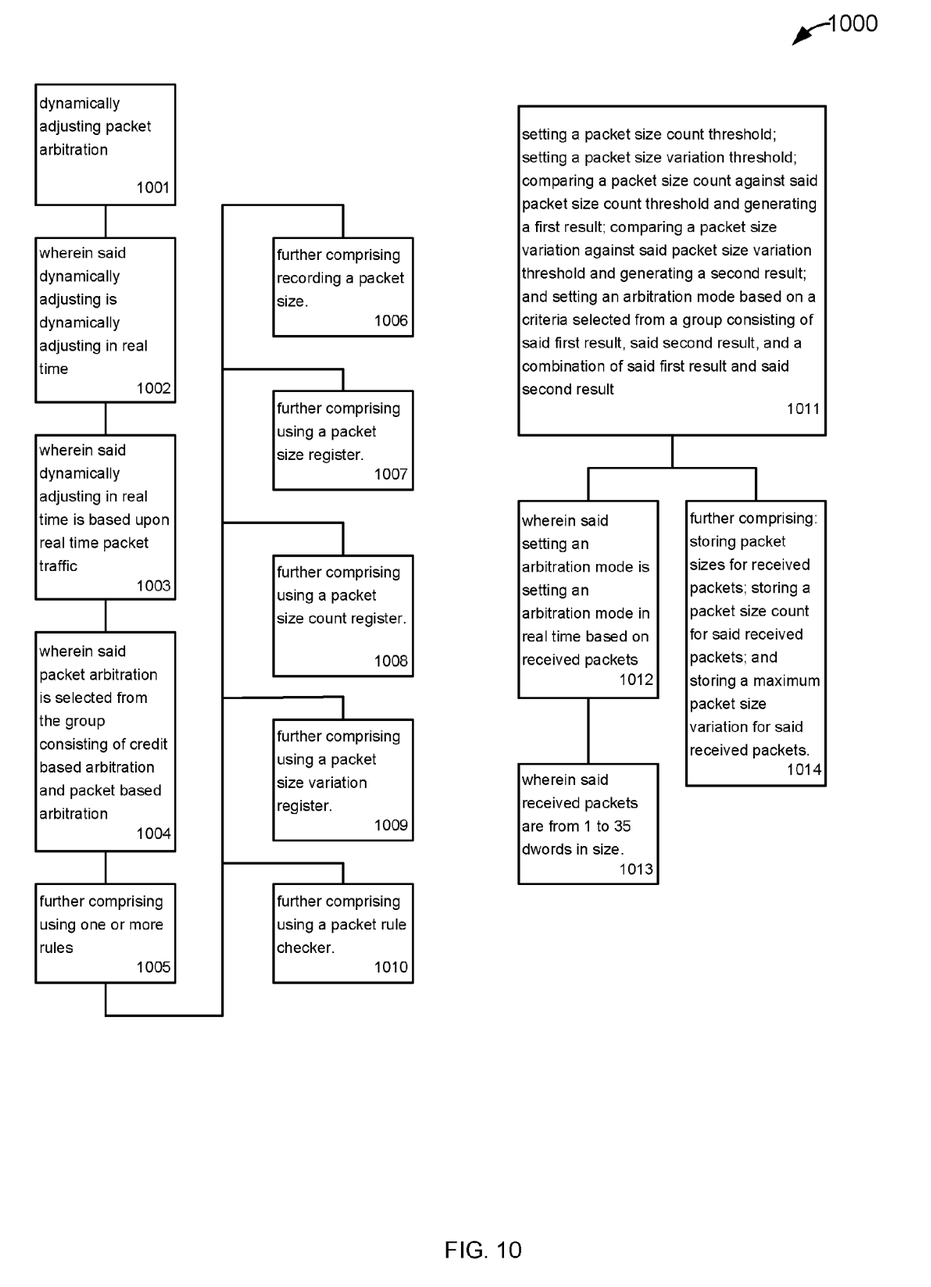
FIG. 10 illustrates various embodiments of the invention.

FIG. 10 illustrates, generally at 1000, various embodiments of the invention. In one embodiment of the invention, at 1001 is shown dynamically adjusting packet arbitration. In one embodiment of the invention, at 1002 is shown wherein said dynamically adjusting is dynamically adjusting in real time. In one embodiment of the invention, at 1003 is shown wherein said dynamically adjusting in real time is based upon real time packet traffic. In one embodiment of the invention, at 1004 is shown wherein said packet arbitration is selected from the group consisting of credit based arbitration and packet based arbitration. In one embodiment of the invention, at 1005 is shown further comprising using one or more rules. In one embodiment of the invention, at 1006 is shown further comprising recording a packet size. In one embodiment of the invention, at 1007 is shown further comprising using a packet size register. In one embodiment of the invention, at 1008 is shown further comprising using a packet size count register. In one embodiment of the invention, at 1009 is shown further comprising using a packet size variation register. In one embodiment of the invention, at 1010 is shown further comprising using a packet rule checker. In one embodiment of the invention, at 1011 is shown setting a packet size count threshold; setting a packet size variation threshold; comparing a packet size count against said packet size count threshold and generating a first result; comparing a packet size variation against said packet size variation threshold and generating a second result; and setting an arbitration mode based on a criteria selected from a group consisting of said first result, said second result, and a combination of said first result and said second result. In one embodiment of the invention, at 1012 is shown wherein said setting an arbitration mode is setting an arbitration mode in real time based on received packets. In one embodiment of the invention, at 1013 is shown wherein said received packets are from 1 to 35 dwords in size. In one embodiment of the invention, at 1014 is shown further comprising: storing packet sizes for received packets;

storing a packet size count for said received packets; and storing a maximum packet size variation for said received packets.

One of skill in the art will appreciate that variations of the invention are possible and within the teaching of the disclosure but not explicitly described. For example, two rules have been described, however, the invention is not so limited and additional rules or fewer rules may be used. For example, while a packet size variation has been described a different embodiment may "weigh" the sizes (e.g. time averaged) to provide a different type of rule input Thus a method and apparatus for dynamic traffic management with packet classification have been described.

Figure 1:
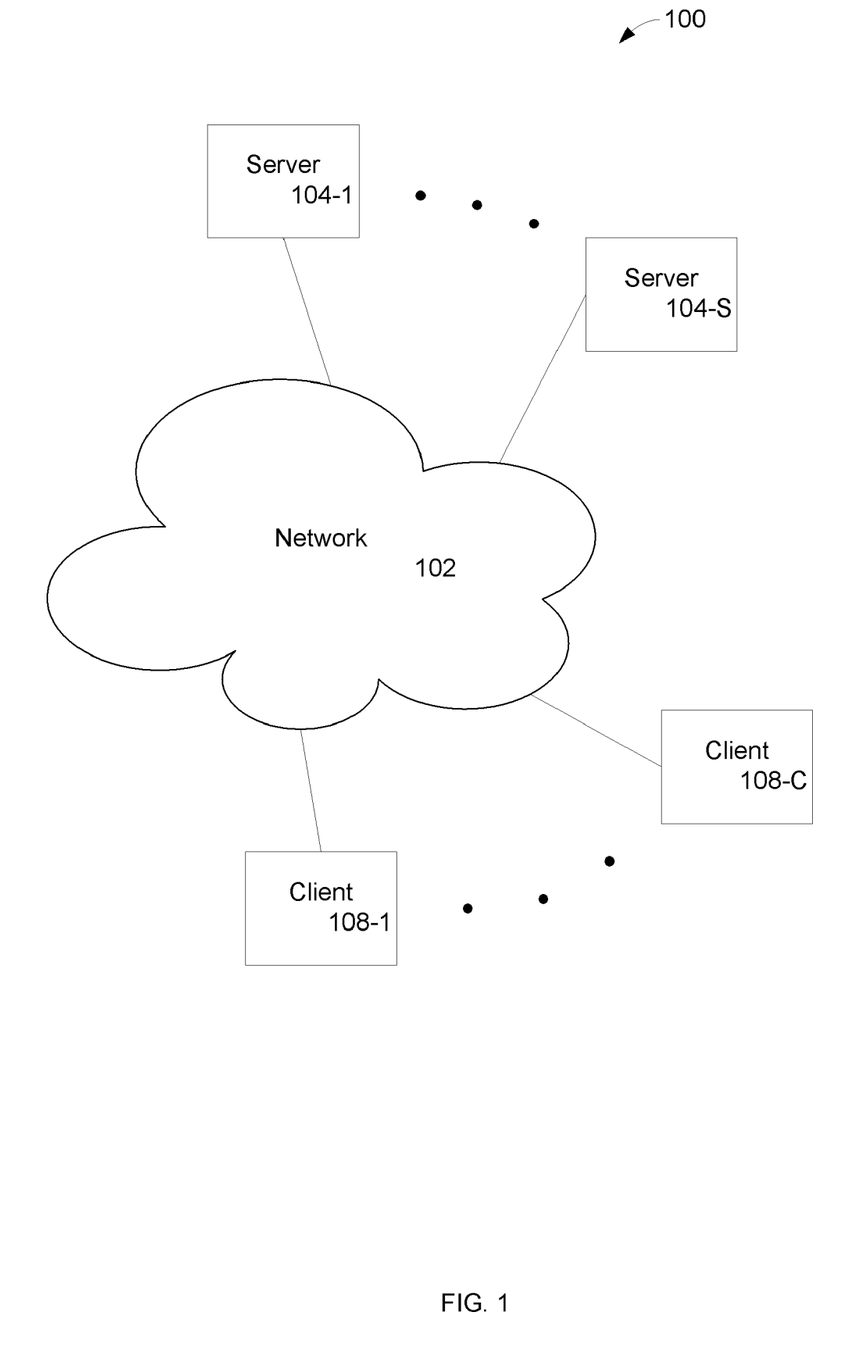
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
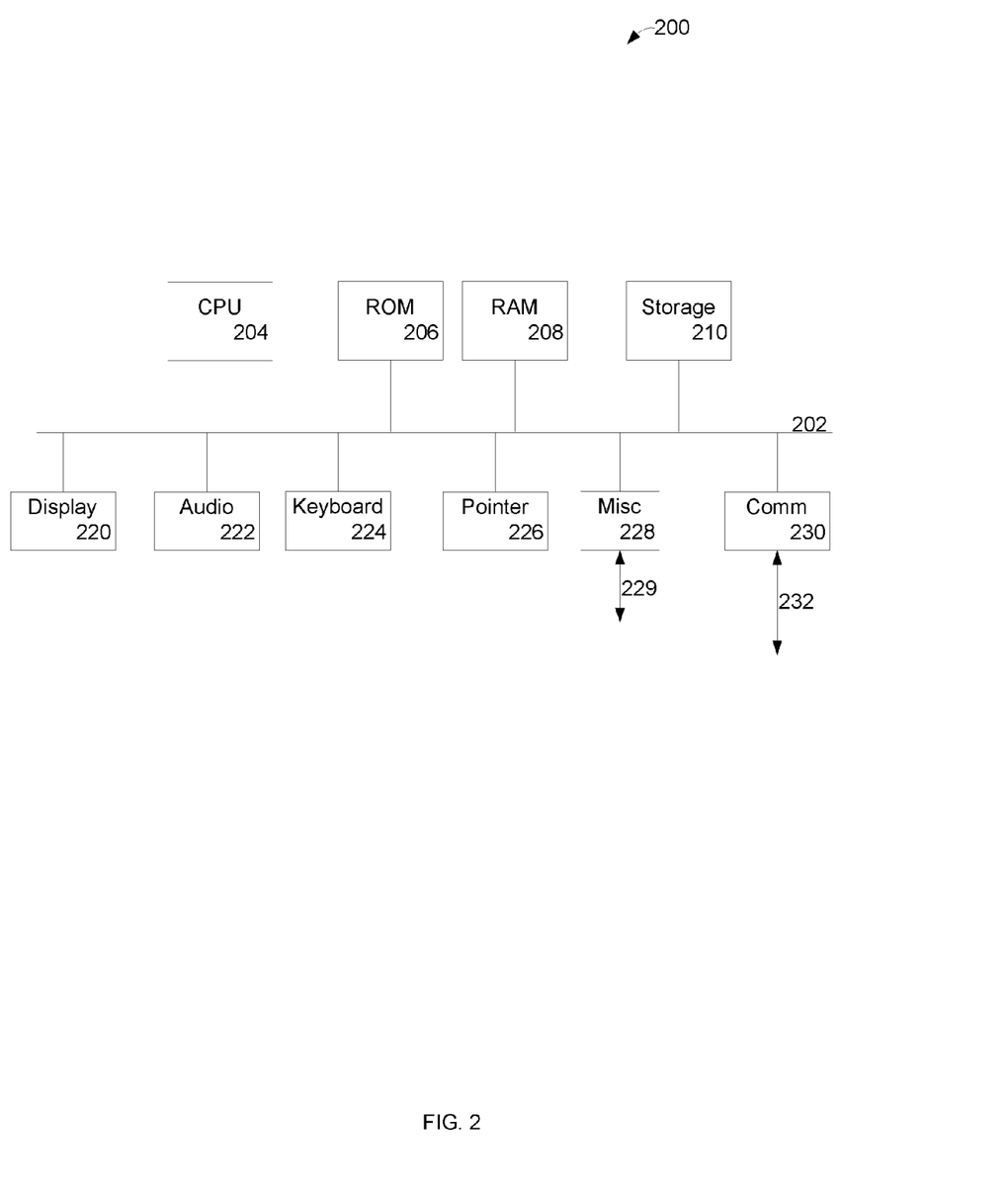
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: cut-through also spelled cut through; stomp is also spelled STOMP; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for dynamic traffic management with packet classification have been described.

What is claimed is:
1. A method comprising:
setting a packet size count threshold;
setting a packet size variation threshold;
comprising a packet size count against said packet size count threshold and generating a first result;
comparing a packet size variation against said packet size variation threshold and generating a second result; and
setting an arbitration mode based on a criteria selected from a group consisting of said first result, said second result, and a combination of said first result and said second result; and wherein said setting an arbitration mode is dynamically adjusting said arbitration mode.
2. The method of claim 1 wherein said dynamically adjusting is dynamically adjusting in real time.
3. The method of claim 2 wherein said dynamically adjusting in real time is based upon real time packet traffic.
4. The method of claim 3 wherein said arbitration mode is selected from the group consisting of credit based arbitration and packet based arbitration.
5. The method of claim 4 further comprising using one or more rules.
6. The method of claim 5 further comprising recording a packet size.
7. The method of claim 5 further comprising using a packet size register.
8. The method of claim 5 further comprising using a packet size count register.

9. The method of claim 5 further comprising using a packet size variation register.

10. The method of claim 5 further comprising using a packet rule checker.

11. A method comprising:
setting a packet size count threshold;
setting a packet size variation threshold;
comparing a packet size count against said packet size count threshold and generating a first result;
comparing a packet size variation against said packet size variation threshold and generating a second result; and
setting an arbitration mode based on a criteria selected from a group consisting of said first result, said second result, and a combination of said first result and said second result.

12. The method of claim 11 wherein said setting an arbitration mode is setting an arbitration mode in real time based on received packets.

13. The method of claim 12 wherein said received packets are from 1 to 35 dwords in size.

14. The method of claim 11 further comprising:
storing packet sizes for received packets;
storing a packet size count for said received packets; and
storing a maximum packet size variation for said received packets.

15. An apparatus comprising:
a plurality of ingress ports, wherein each of said plurality of ingress ports has a plurality of ingress buffers;
a switch fabric having a plurality of crosspoint buffers, wherein one or more of said plurality of ingress orts is in operative communication with one or more of said plurality of crosspoint buffers;
a plurality of egress ports, wherein each of said plurality of egress ports has a plurality of egress buffers, wherein one or more of said plurality of egress ports is in operative communication with one or more of said plurality of crosspoint buffers;
an arbitration logic block for each column of said crosspoint buffers;
further comprising a set of packet size registers for each of said arbitration logic block for each column of said crosspoint buffers;
further comprising a packet size variation register for each of said arbitration logic block for each column of said crosspoint buffers;
further comprising a packet size count register for each of said arbitration logic block for each column of said crosspoint buffers;
further comprising a packet rule checker; and
wherein said packet rule checker selects packet based arbitration for a particular arbitration logic block for a particular column of said crosspoint buffers when for all said crosspoint buffers in said particular column a packet size count <=a packet size count threshold AND a packet size variation <=a packet size variation threshold, otherwise said packet rule checker selects credit based arbitration for said particular arbitration logic block for said particular column of said crosspoint buffers.

* * * * *